(12) United States Patent
Kogure

(10) Patent No.: US 7,187,138 B2
(45) Date of Patent: Mar. 6, 2007

(54) EXCIMER LAMP APPARATUS

(75) Inventor: Yasuo Kogure, Toda (JP)

(73) Assignee: Hoya Candeo Optronics Corporation, Toda (JP)

( * ) Notice: Subject to any disclaimer, the term of this patent is extended or adjusted under 35 U.S.C. 154(b) by 58 days.

(21) Appl. No.: 11/114,239

(22) Filed: Apr. 26, 2005

(65) Prior Publication Data

US 2006/0097657 A1 May 11, 2006

(30) Foreign Application Priority Data

Jun. 23, 2004 (JP) ............................. 2004-212298
Feb. 10, 2005 (JP) ............................. 2005-034978

(51) Int. Cl.
*H05B 41/16* (2006.01)

(52) U.S. Cl. ...................................... 315/248; 313/607
(58) Field of Classification Search ................ 315/248, 315/358, 344, 46; 313/607, 641, 642, 634
See application file for complete search history.

(56) References Cited

U.S. PATENT DOCUMENTS

| 5,343,114 | A | * | 8/1994 | Beneking et al. | ............ 313/485 |
| 5,504,391 | A | * | 4/1996 | Turner et al. | ................ 313/570 |
| 6,379,024 | B1 | * | 4/2002 | Kogure et al. | ............... 362/263 |
| 6,525,472 | B2 | * | 2/2003 | Okugi | ........................ 313/607 |
| 2004/0263043 | A1 | * | 12/2004 | Claus et al. | ................. 313/234 |

FOREIGN PATENT DOCUMENTS

JP 2000-311658 A 11/2000

* cited by examiner

*Primary Examiner*—Trinh Vo Dinh
(74) *Attorney, Agent, or Firm*—Nixon & Vanderhye P.C.

(57) ABSTRACT

The invention provides an excimer lamp apparatus that has advanced start-up properties, in terms of start-up time and start-up stability, in the presence of voltage variations, without any trigger electrode, by arranging a pair of electrodes along the entire length of a discharge container. An ultra-violet emitter is arranged to irradiate discharge gas in the discharge container with ultra-violet light, and the excimer lamp is started up by means of exposure with ultra-violet light from the ultra-violet emitting unit.

11 Claims, 14 Drawing Sheets

EXCIMER LAMP APPARATUS

BACKGROUND OF THE INVENTION

1. Field of the Invention

The present invention relates to an excimer lamp apparatus that radiates ultra-violet light, for example, to cure resin or for surface treatment and/or surface cleaning of semiconductor wafers, glass substrates, and so on.

2. Description of Related Art

An excimer lamp that is included in an excimer lamp apparatus is described in Japanese Unexamined Patent Application Publication No. 2000-311658.

This excimer lamp is an electrodeless field-discharge excimer lamp including a discharge container containing discharge gas therein and having an outer electrode wound around the outside thereof. A highly electrically insulating tube having an inner electrode wound around the outside thereof is inserted in the discharge container substantially at the center thereof. Excimer lamp illumination is performed by electric field discharge by applying a high frequency ranging from 1 MHz to 100 MHz, to the inner electrode. The highly insulating tube has a trigger electrode and the inner electrode, which has two slit sections extending along the entire length of the tube axis.

Japanese Unexamined Patent Application Publication No. 2000-311658, paragraph [0013] discloses that an excimer lamp having such a configuration as described above will be able to start up quickly as a result of superposition effects generated by two discharges: one is the discharge formed between the trigger electrode and the outer electrode, and another is between the outer electrode and the inner electrode.

Therefore, in order to start-up quickly by generating discharge, this excimer lamp must have the trigger electrode separately from the inner electrode.

In consequence, the trigger electrode should be set facing the outer electrode, with the discharge space of the container therebetween. The inner electrode is limited in size and cannot be disposed along the entire space of the discharge container because of the space occupied by the trigger electrode and a spacing needed to avoid non-intentional discharging between the inner electrode and the trigger electrode in the adjacent slits, thus making it difficult to ensure a sufficiently large discharge region inside the discharge container.

BRIEF SUMMARY OF THE INVENTION

A first object of the present invention is to provide an excimer lamp apparatus with improved start-up properties without providing a trigger electrode such as that described above.

A second object of the present invention is to provide an excimer lamp apparatus that has stable start-up properties under various conditions, for example, if the voltage level supplied to the electrodes fluctuates, and especially if the supply voltage is reduced.

After intensive study, the inventor of the present invention have discovered that the problems described above can be solved by providing the excimer lamp apparatus with an ultra-violet emitter that radiates ultra-violet light to the discharge gas which is contained inside the discharge container and by applying a voltage to the electrodes from the power supply while this ultra-violet emitter irradiates the discharge gas with ultra-violet light.

To realize the above-mentioned objects, the invention according to the present invention is as follows.

(1) An excimer lamp apparatus including: a discharge container that has a discharge space filled with discharge gas to generate an excimer light, a part of the discharge container being transparent to the excimer light to be emitted from the discharge space; an excimer lamp that has an electrodes and that generates discharge in the discharge gas; a power supply for applying a voltage to the electrode; and an ultra-violet emitter that is arranged therein to radiate ultra-violet light to the discharge gas filled in the dielectric container, wherein the excimer lamp starts up by applying a voltage to the electrodes when that the ultra-violet emitter is radiating ultra-violet light to the discharge gas.

(2) The invention may have an excimer lamp that has a pair of facing electrodes on respective outside surfaces of the discharge container.

(3) The invention may also include a lamp housing in which the excimer lamp is housed, and an ultra-violet transmitting window that is located in a part of a wall of the lamp housing, wherein the ultra-violet emitter is located outside the lamp housing and ultra-violet light that the ultra-violet emitter emits passes through the ultra-violet transmitting window, and irradiates the discharge gas.

(4) The invention may also have an ultra-violet transmitting window that is located in a part of a wall of the excimer lamp, wherein ultra-violet light that the ultra-violet emitter emits passes through the ultra-violet transmitting window, and irradiates the discharge gas.

(5) Preferably, in the present invention, a thin film layer may be formed on the surface of the ultra-violet transmitting window, which blocks vacuum ultra-violet light with a wavelength under 200 nm and transmits ultra-violet light whose wavelength is longer than 200 nm.

(6) The present invention preferably includes light detecting means for detecting light whose wavelength is contained in excimer light that the excimer lamp emits; and voltage shut-off means for automatically shutting off the voltage applied to the ultra-violet emitter in accordance with detected results of the light detecting means.

(7) In the present invention, the number of ultra-violet emitters may be less than the number of excimer lamps.

With the excimer lamp apparatus according to (1) or (2) above, when the ultra-violet emitter irradiates the discharge gas, the excimer lamp starts up by applying a voltage to the electrodes of the excimer lamp. Therefore, it is possible to improve the start-up time compared to the case where a voltage is applied to the electrodes of the conventional excimer lamp to start up the excimer lamp. An improvement of 20% can also be achieved in terms of stable start-up voltage.

The term "stable start-up voltage" in the present invention means the applied voltage at which the excimer lamp starts to emit excimer light with 100% probability without exposing the discharge gas to ultra-violet light from the ultra-violet emitter according to the present invention.

According to the present invention described in (3) above, the present invention reduces the lamp housing volume and allows greater design flexibility in the placement of the ultra-violet emitter, in addition to the advantages provided by the excimer lamp apparatus according to aspects (1) or (2), because the ultra-violet emitter is placed outside the housing, which has the ultra-violet transmitting window through which ultra-violet light is transmitted into the discharge space of the discharge container where discharge gas is encapsulated.

According to the present invention described in (4) above, the present invention reduces the size of the lamp housing containing the excimer lamp and allows greater design flexibility in the placement of the ultra-violet emitter, in addition to the advantages of the excimer lamp apparatus of aspects (1) or (2) because, on a part of a wall of the excimer lamp, the excimer lamp has the ultra-violet transmitting window through which ultra-violet light is transmitted into the discharge space of the discharge container where discharge gas is encapsulated.

According to the present invention described in (5) above, the present invention controls the transmittance wavelength by forming a thin film on the ultra-violet transmitting window in the excimer lamp apparatus described in aspects (2), (3) or (4), and prevents transmission of vacuum ultra-violet light through the ultra-violet transmitting window by transmitting light whose wavelength is over 200 nm and blocking light whose wavelength is under 200 nm.

For example, xenon gas-based excimer lamp emits ultra-violet light whose central wavelength is 172 nm. Only the processing chamber will be irradiated with this ultra-violet light because the thin films on the ultra-violet transmitting window blocks ultra-violet light whose wavelength is under 200 nm (this light is called "vacuum ultra-violet light" hereinafter). Then, incidental ozone generation, which would normally occur if the vacuum ultra-violet light were absorbed by the oxygen in the outside air through the ultra-violet transmitting window, is avoidable.

According to the present invention described in (6) above, the present invention provides a longer lifetime of the ultra-violet emitter in the excimer lamp apparatus described in aspects (1), (2), (3), (4) or (5) compared to an excimer apparatus in which the ultra-violet light emitter is constantly illuminated because the ultra-violet emitter will illuminate only when the apparatus is starting up by providing the automatic applied-voltage shut-off means using data detected by the light detecting means. The light detected by the detecting means is a part of the excimer light emitted from the excimer lamp.

According to the present invention described in (7) above, the present invention provides an apparatus with fewer ultra-violet emitters than the number of excimer lamps; therefore, the number of ultra-violet emitters and the number of power supplies that start-up the ultra-violet emitters can be reduced.

DESCRIPTION OF THE PREFERRED EMBODIMENTS

Figure 1:
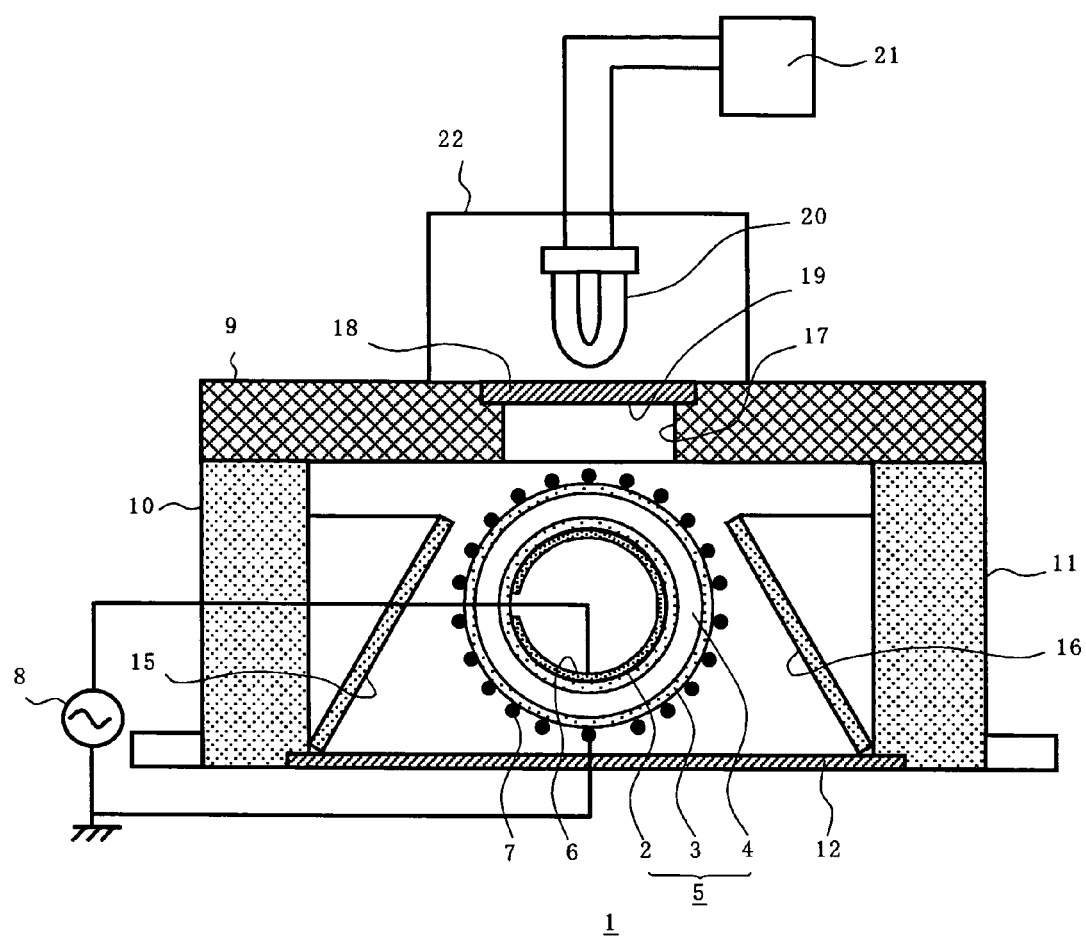
FIG. 1 is cross sectional view of an excimer lamp apparatus according to a first embodiment of the present invention.

The excimer lamp apparatus according to the present invention includes a discharge container having a discharge space in which discharge gas for generating excimer is encapsulated, part of the discharge container being transparent to the excimer light to be emitted from the discharge space, an excimer lamp having electrodes which generate discharges in the discharge gas, a power supply which applies a voltage to the electrodes; and an ultra-violet emitter that radiates ultra-violet light to the discharge gas filled in the discharge space. The excimer lamp starts up by applying a voltage to the electrodes from the power supply when the ultra-violet emitter is radiating ultra-violet light to the discharge gas.

The term "excimer lamp" is used here to mean a discharge lamp that emits high-intensity excimer light. There are many other names to refer to this excimer lamp, such as "high power radiator", which focuses on the feature of emitting high-power excimer light; "dielectric barrier discharge lamp", which focuses on the dielectric barrier discharge feature; "electrodeless field discharge excimer lamp", which focuses on the fact that there are no electrodes in the discharge container, as indicated by the term "electrodeless", and that a high-frequency voltage is applied to the electrodes placed on each outside lateral surface of the discharge container, as indicated by the term "field discharge". In this document we call these lamps "excimer lamps" in general.

The power supply that applies a voltage to the electrodes of the excimer lamp is suitably designed according to the discharge conditions. In a typical design, an output voltage ranging from a few kilovolts to a few tens of kilovolts with a frequency ranging from a few tens of kilohertz to a few tens of megahertz is chosen.

The discharge gas is selected one of rare gases such as xenon, argon and krypton or a mixed gas of one of rare gases described above with chlorine gas.

The center wavelength of the excimer light depends on the discharge gas substance. It is known that: if the discharge gas contains xenon, the center wavelength is 172 nm; if the discharge gas contains argon, the center wavelength is 126 nm; if discharge gas contains krypton, the center wavelength will be 146 nm; if the discharge gas contains argon and chlorine, the center wavelength is 175 nm; if the discharge gas contains xenon and chlorine, the center wavelength is 308 nm; and if the discharge gas contains krypton and chlorine, the center wavelength is 222 nm.

Various shapes may be used for the discharge container according to the present invention, so long as that shape is made airtight. Such shapes may be, for example, a cylinder-like shape, a bi-cylindrical shape, a substantially planar shape, a box shape, or the like.

The dielectric material of which the discharge container is formed must transmit excimer light effectively to the outside. Examples of such material are quartz glass, sapphire, or magnesium fluoride.

Among the electrodes used in the present invention, regarding the electrode located at the position of the light transmitting area, an electrode having a shape that enables excimer light to pass through the electrode, for example, a mesh-shaped or spiral-shaped electrode, is used.

The ultra-violet emitter used in the present invention is a light source that emits ultra-violet light. This emitter may be a light source such as a lamp that mainly emits ultra-violet light, for example, a low-pressure mercury vapor lamp or a black-light lamp; a light-emitting diode that mainly emits ultra-violet light; or a lamp that mainly emits visible light and a small amount of incidental ultra-violet light, such as, for example, a halogen lamp.

First Embodiment

Figure 2:
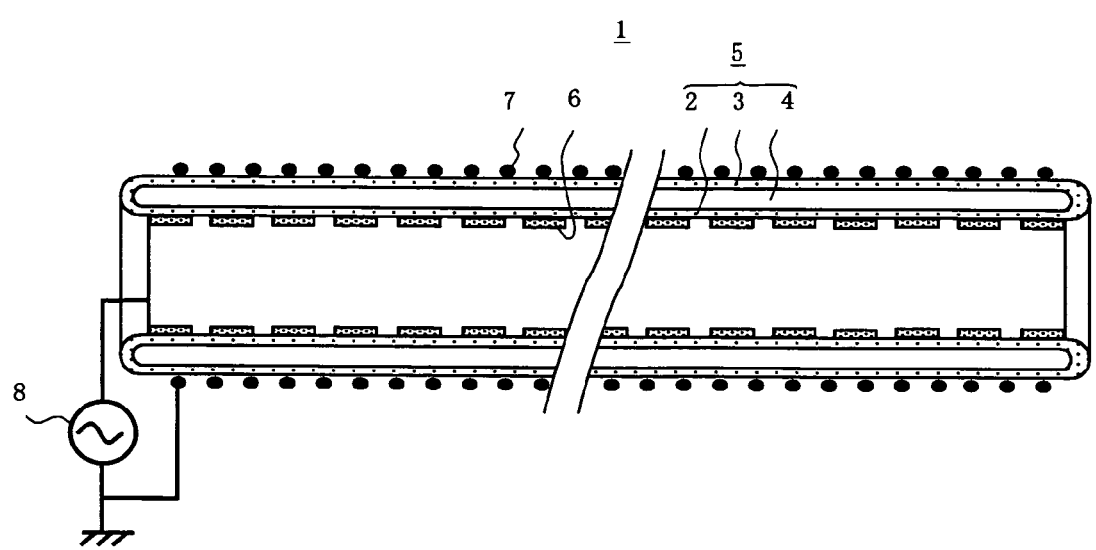
FIG. 2 is longitudinal sectional view of an excimer lamp used in the excimer lamp apparatus according to the first embodiment of the present invention.

FIG. 1 shows a cross section of an excimer lamp apparatus according to a first embodiment of the present invention. FIG. 2 shows a longitudinal section of an excimer lamp 1 used in this excimer lamp apparatus.

The excimer lamp 1 has a container 5 which is made of quartz glass and whose length is 850 mm. Inside the container 5 are provided an internal tube 2 whose outer diameter is 23 mm and whose thickness is 1.2 mm, an external tube 3 whose outer diameter is 35 mm and whose thickness is 1.2 mm, and an airtight bi-cylindrical discharge space 4 in the space formed by the internal tube 2 and the external tube 3, which are concentrically arranged.

Xenon gas, serving as the discharge gas, is encapsulated in the discharge space 4, whose pressure is set to 500 torr. A strip-like stainless-steel inner electrode 6 is disposed on the surface of the internal tube 2 outside discharge space in the discharge container 5, in a circular shape along this surface. A mesh-shaped outer electrode 7 formed of nickel-based alloy covers the outer surface of the external tube 3 in the discharge container 5.

A high-frequency power supply 8 is connected to the pair of electrodes formed of the inner electrode 6 and the outer electrode 7, and the high-frequency power supply 8 applies a high-frequency voltage of frequency 2 MHz and voltage 7.5 kV p-p, serving as a stable start-up voltage, to the inner electrode 6 and the outer electrode 7 and causes the excimer lamp 1 to start emitting vacuum ultra-violet light with a central wavelength of 172 nm.

The excimer lamp 1 is placed into a lamp housing that is formed, in an airtight manner, of an upper cover 9, a left side wall 10, a right side wall 11, an excimer light transmitting window 12, a front wall, and a back wall. The front and back walls are not shown in the drawings.

The components, except the excimer light transmitting window 12, that compose the lamp housing, that is, the upper cover 9, the left side wall 10, the right side wall 11, the front wall, and the back wall, may be made of stainless-steel, and the excimer light transmitting window 12 may be made of quartz glass. Vacuum ultra-violet light irradiates a working object, which is not shown, in a processing chamber through the excimer light transmitting window 12. Reflection mirrors 15 and 16 are arranged along the longitudinal direction of the excimer lamp 1, surrounding it, inside the lamp housing and guide excimer light emitted from the excimer lamp 1 to the excimer light transmitting window 12.

An ultra-violet transmitting hole 17 (diameter: 20 mm) is formed in the upper cover 9 at any position facing the outer electrode 7, which is disposed in the longitudinal direction thereof. An ultra-violet transmitting window 18, which may be made of quartz glass, is set in the ultra-violet transmitting hole 17 in an airtight manner.

A multi-layered thin film 19 that consists of alternating hafnium-oxide and silicon-oxide layers is formed on the surface at the excimer lamp side of the ultra-violet transmitting window 18. This thin film 19 transmits light with a wavelength over 200 nm and blocks light with a wavelength equal to or under 200 nm.

A low-pressure mercury vapor lamp 20, serving as the ultra-violet light emitter, is arranged over the ultra-violet transmitting window 18, as shown in the drawings. A high-frequency voltage is applied to the low-pressure mercury vapor lamp 20 from a high-frequency lighting circuit 21, and the low-pressure mercury vapor lamp 20 starts emitting light with a peak wavelength of 254 nm.

The high-frequency lighting circuit 21 obtains a high-frequency from alternating current, via direct current, and contains an inverter circuit to generate the high frequency alternating current from the direct current. A lamp cover 22 surrounds the low-pressure mercury vapor lamp 20 and protects it.

The low-pressure mercury vapor lamp 20 irradiates xenon gas encapsulated in the discharge space 4 of the excimer lamp 1 in the lamp housing through the ultra-violet transmitting window 18, on which the thin film 19 is formed, with ultra-violet light (the center wave length is 254 nm).

The start-up time of the excimer lamp 1 according to the first embodiment was measured by applying a stable start-up voltage (frequency 2 MHz, voltage 7.5 kV p-p), both with and without illuminating the low-pressure mercury vapor lamp 20. This measurement showed that the start-up time was about 100 microseconds when illuminating the low-pressure mercury vapor lamp 20 and that the start-up time was about 30,000 microseconds when not illuminating the low-pressure mercury vapor lamp 20. The start-up time is dramatically improved when the low-pressure mercury vapor lamp 20 is lit.

Figure 3:
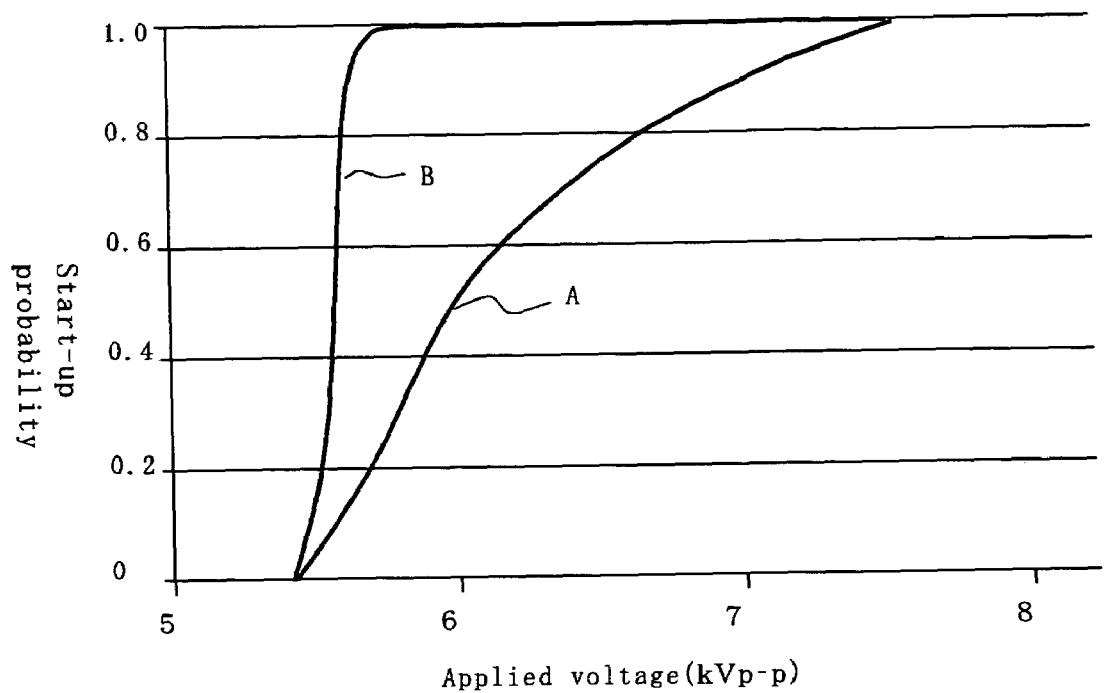
FIG. 3 is a characteristic graph showing the excimer lamp start-up probability versus applied voltage in the excimer lamp apparatus according to the first embodiment of the present invention.

FIG. 3 shows a graph of the start-up probability versus applied voltage, whose data was obtained by varying the applied voltage from 5.0 kV p-p, which is lower than the stable start-up voltage (7.5 kV p-p), to the stable start-up voltage while measuring the start-up probability. In the FIG. 3, the start-up probability of the excimer lamp 1 is plotted. Each start-up probability is the average value when measured ten times. Curve A shows the start-up probability characteristic measured without lighting the low-pressure mercury vapor lamp 20. Curve B shows the start-up probability characteristic measured with the low-pressure mercury vapor lamp 20 lit.

Curve A in FIG. 3 shows that, in the case without lighting the low-pressure mercury vapor lamp 20, the excimer lamp 1 did not start up under 5.4 kV p-p, start-up began to occur when the voltage applied to the excimer lamp 1 was greater than 5.4 kV p-p, the start-up probability gradually increased as the applied voltage increased, and the start-up probability reached 100% at an applied voltage of 7.5 kV p-p.

Curve B in FIG. 3 shows that, in the case where the low-pressure mercury vapor lamp 20 was lit, the excimer lamp 1 did not start up under 5.4 kV p-p, which was the same as the case without lighting the low-pressure mercury vapor lamp 20, but the increase in the start-up probability was steeper than that without lighting the low-pressure mercury vapor lamp 20. In addition, the start-up probability of the excimer lamp 1 was 100% at an applied voltage of 5.8 kV p-p, which is about 23% smaller than the voltage of 7.5 kV p-p.

Therefore, we can confirm that, in the excimer lamp apparatus according to the first embodiment, the excimer lamp 1 can always start-up with an applied voltage 20% smaller than the stable start-up voltage of the conventional excimer lamp when the low-pressure mercury vapor lamp 20 is lit.

In the conventional excimer lamp design, a stable start-up voltage tends to be set to a comparably higher value in case the applied voltage fluctuates. The stable start-up voltage in the excimer lamp 1 can be designed to have a comparably lower value even if there are changes in applied voltage. Thus, unintentional discharge, which often occurs in the conventional apparatus, because the stable start-up voltage is set relatively high, as is used conventionally, is avoidable.

The low-pressure mercury vapor lamp 20 is located outside the housing in the excimer lamp apparatus according to the first embodiment. This enables flexible design choices in arranging the low-pressure mercury vapor lamp 20 in the apparatus, and also makes the volume of the housing smaller than compared to the case where the low-pressure mercury vapor lamp 20 is arranged in the lamp housing.

According to the first embodiment, the thin film 19 blocks light with a wavelength under 200 nm and transmits light with a wavelength over 200 nm. Therefore, vacuum ultra-violet light from the excimer lamp 1 causes no ozone generation because the ultra-violet transmitting window 17 blocks transmission of such vacuum ultra-violet light.

Second Embodiment

Figure 4:
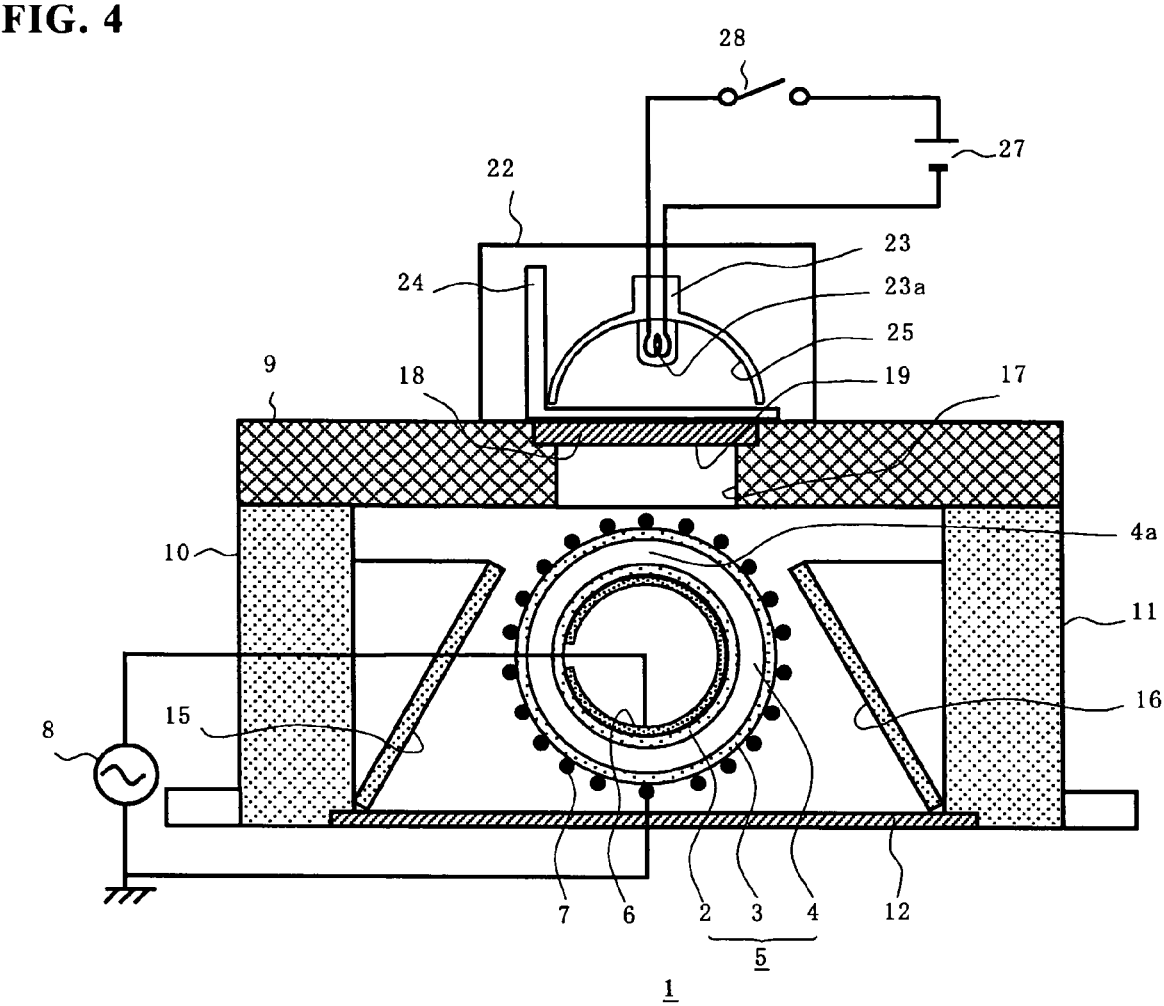
FIG. 4 is a cross sectional view of an excimer lamp apparatus according to a second embodiment of the present invention.

FIG. 4 shows a cross section of an excimer lamp in an excimer lamp apparatus according to a second embodiment of the present invention.

Compared to the first embodiment, the significant differences in this excimer lamp apparatus according to the second embodiment are the following two points: first, the stable start-up voltage of the excimer lamp is changed to have a frequency of 2 MHz and a voltage of 8.1 kV p-p; and second, a halogen lamp and a power supply circuit for starting up the halogen lamp are used as the ultra-violet emitter. The remaining configuration is essentially the same as in the first embodiment, so the same reference numerals as used in the first embodiment are used for describing these elements.

A halogen lamp 23 (power consumption 100 W, rated voltage 12 V) used as the ultra-violet emitter mainly emits light whose wavelength region is in the visible and infrared, but a small portion of the light falls in the wavelength range from 250 nm to 380 nm in the ultra-violet. For example, the intensity of 380-nm ultra-violet light is about 5% compared to the intensity of 900-nm infrared light.

The halogen lamp 23 has a disadvantage in that the intensity of ultra-violet light is lower compared to an ultra-violet lamp such as a low-pressure mercury vapor lamp; however, as described later, the halogen lamp 23 is lit before the excimer lamp 1 starts to emit, and after the excimer lamp 1 is started, the halogen lamp 23 is turned off. Therefore, if the lamp is turned on and off repeatedly, the halogen lamp 23 has an advantage because its turn-on time is quick compared to an ultra-violet lamp.

The halogen lamp 23 is supported by and fixed to a lamp holder 24, which is secured to the upper cover 9, so that the ultra-violet transmitting hole 17 and the ultra-violet transmitting window 18 are arranged substantially on the same axis, and has a reflection mirror 25 whose inner spherical surface is coated with aluminum.

The curved surface of this reflection mirror 25 is designed so that it has a focal point at a light emitting part 23a of the halogen lamp 23 and a second focal point at a central part 4a inside the discharge space 4 of the excimer lamp 1, closest to the halogen lamp 23 side; therefore, ultra-violet light emitted from the halogen lamp 23 will be reflected by the reflection mirror 25 and focused at the halogen lamp 23 side of the discharge space 4 of the excimer lamp 1.

A power supply circuit for lighting the halogen lamp 23 includes a power supply 27 (DC Voltage: 12 V) and an opening/closing switch 28, and is designed so that the opening/closing switch 28 is closed (on) only when starting up the halogen lamp 23, and so that the opening/closing switch 28 is open (off) at other times.

Although the amount of ultra-violet light emitted when starting up the halogen lamp 23 is small, as mentioned before, it passes through the ultra-violet transmitting window 18, on which the thin film 19 is formed, and irradiates the xenon gas around the central part 4a in the discharge space 4 of the excimer lamp 1 where the ultra-violet light converges to a focal point.

In the excimer lamp apparatus according to the second embodiment, the start-up time of the excimer lamp 1 was measured by applying a stable start-up voltage (frequency 2 MHz, voltage 8.1 kV p-p), both with and without illuminating the halogen lamp 23. This measurement showed that the start-up time was about 30 microseconds when illuminating the halogen lamp 23 and that the start-up time was about 6,960 microseconds when not illuminating the halogen lamp 23. The start-up time is dramatically improved when the halogen lamp 23 is lit by exposing the xenon gas to a small amount of ultra-violet light.

The start-up probability versus applied voltage was measured by varying the applied voltage from 5.0 kV p-p, which is lower than the stable start-up voltage (8.1 kV p-p), to the stable start-up voltage both with and without illumination of the halogen lamp 23. Each start-up probability is the average value when measured ten times. The characteristics of this measurement are the same as in FIG. 3 shown in the first embodiment when lighting the halogen lamp 23 and radiating a small amount of ultra-violet light to the xenon gas.

Therefore, we can confirm that, in the excimer lamp apparatus according to the second embodiment, the excimer lamp 1 can always start-up with an applied voltage 20% smaller than the stable start-up voltage of the conventional excimer lamp when the halogen lamp 23 is lit.

In the excimer lamp apparatus according to the second embodiment, the halogen lamp 23 is lit only when starting-up the excimer lamp 1, and so the lifetime of the halogen lamp 23 will be longer.

Third Embodiment

Figure 5:
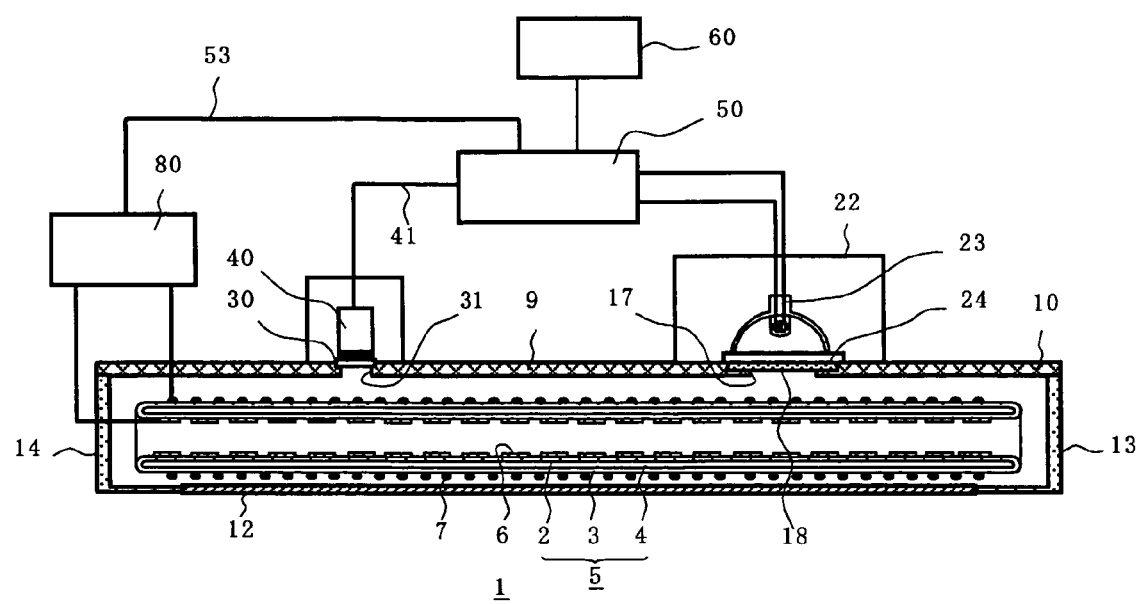
FIG. 5 is a sectional view along with longitudinal axis of an excimer lamp apparatus according to a third embodiment of the present invention.

FIG. 5 shows a vertical longitudinal section of an excimer lamp of an excimer lamp apparatus according to a third embodiment of the present invention, taken along a central axis in the longitudinal direction. In this FIG. 5, a front wall 13 and a back wall 14, which form a lamp housing that is not shown in FIG. 1 or 4, are shown.

Compared to the second embodiment, the main differences in this excimer lamp apparatus according to the third embodiment are the following: an infra-red transmitting filter 30 which transmits infra-red light among the light emitted from the excimer lamp 1; a silicon photo-diode 40 serving as an infra-red detector to detect this infra-red light; and a lighting controller 50 which controls the turning on of the excimer lamp 1 and the halogen lamp 23 are provided. The remaining configuration is essentially the same as in the first and second embodiments, so the same reference numerals in the first and second embodiments are used for describing these elements.

Figure 6:
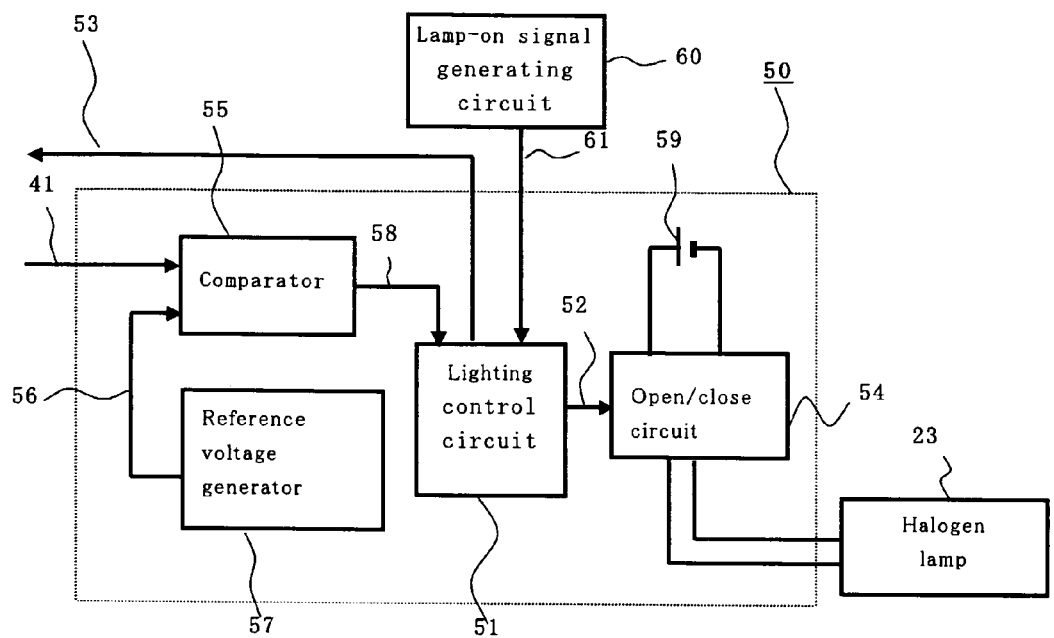
FIG. 6 is a block diagram of a lighting controller of an excimer lamp apparatus according to a third embodiment of the present invention.

FIG. 6 shows a block diagram of the lighting controller 50. A lighting control circuit 51 in the lighting controller 50 generates a halogen-lamp-on signal 52, when a lamp-on signal 61 is input from a lamp-on signal generating circuit 60 to turn on the excimer lamp 1 and the halogen lamp 23, and outputs this signal 52 to an open/close circuit 54. On the arrival of this halogen-lamp-on signal 52, the open/close circuit 54 closes (connects) and applies a voltage of 12V from a power supply 59 contained therein to the halogen lamp 23, thus turning on the halogen lamp 23.

At the same time, the lighting control circuit 51 also outputs an excimer-lamp-on signal 53 to a high-frequency power supply 80, one second after the lamp-on signal 61 is input using a signal delay line included therein, to turn-on the excimer lamp 1. Although the term "one second after" means a point in time one second after the halogen lamp 23 is lit, it is not necessarily one second; it is a period required to confirm that the halogen lamp 23 is lit.

Concerning the arrangement of the infra-red transmitting filter 30 and the silicon photo-diode 40, a light detection hole 31 is formed in the upper cover 9 of the lamp housing at any position except for the location where a lamp-cover 22 covers the halogen lamp 23, a light-receiving part of the infra-red transmitting filter 30 is fitted into hole 31, so as to ensure airtightness of the lamp housing, and a light-receiving part of the silicon photo-diode 40 is disposed above the infra-red transmitting filter 30.

The excimer lamp 1 radiates mainly vacuum ultra-violet light with a central wavelength of 172 nm, as is described in the first embodiment, but in addition to this vacuum ultra-violet light, the excimer lamp 1 also radiates a small amount of infra-red light whose wavelength is between 800 nm and 1000 nm.

The infra-red transmitting filter 30 is an optical filter, whose model name is IR-76 (made by HOYA CORPORATION), receives excimer light output from the excimer lamp 1, blocks light whose wavelength is 760 nm or less, and transmits light whose wavelength is between 800 nm and 1000 nm. The silicon photo-diode 40 is sold under the model name S1336–44BQ (made by Hamamatsu Photonics K.K.).

The infrared light, which goes through the infrared transmitting filter 30, is detected by the silicon photo-diode 40, and then a photodetection signal 41 that indicates whether the excimer lamp 1 is turned-on is output.

The lighting controller 50 includes a comparator 55 and a reference voltage generator 57, which generates a reference voltage 56. The comparator 55 has input ports for the photodetection signal 41 and the reference voltage 56 and an output port for the turn-on confirmation signal 58, which appears in the case where the photodetection signal 41 is higher than the reference voltage 56.

The reference voltage 56 is set to 3 V as a threshold voltage to judge the turn-on status of the excimer lamp 1. The turn-on confirmation signal 58 will appear on the condition that the photodetection signal 41 is higher than the reference voltage, which is actually 3 V.

With the turn-on confirmation signal 58, the lighting control circuit 51 instructs the open/close circuit 54 to open (off) and the 12-V voltage of the power supply 59, applied up to this point, is turned off to turn the halogen lamp 23 off.

Figure 7:
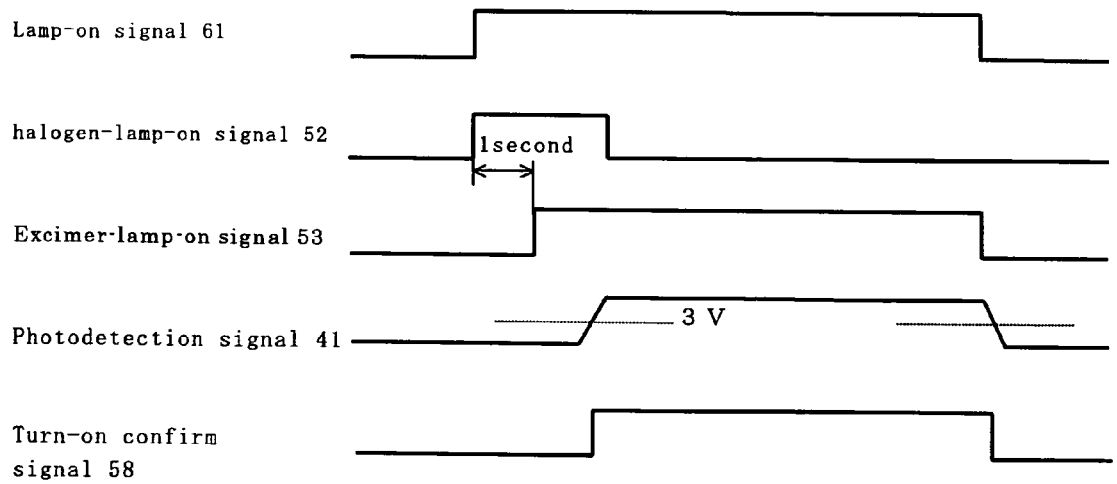
FIG. 7 is a timing chart of a functional state inside the lighting controller.

FIG. 7 shows a timing chart of the operation of the lighting controller 50. In this chart, the lamp-on signal 61, a halogen-lamp-on signal 52, an excimer-lamp-on signal 53, the photodetection signal 41, and the turn-on confirm signal 58 are used as logical signals that have two states, Active (5V) and Inactive (0V).

The signal delay line contained in the lighting control circuit 51, generates about one-second delay between the leading edge of the halogen-lamp-on signal 52 and the excimer-lamp-on signal 53 in FIG. 7, but does not generate any delay time related to the trailing edge of the lamp-on signal 61.

If the "0"-state is output in the lamp-on signal 61, the lighting control circuit 51 makes the excimer-lamp-on signal 53 for the high-frequency power supply 80 also the "0"-state, and then the excimer lamp 1 is turned off, as is shown in FIG. 7.

As described above, in the excimer lamp apparatus according to the third embodiment, lifetime of the halogen lamp 23 is extended longer than if the halogen lamp is always lit when the excimer lamp 1 is lit. Because the excimer lamp apparatus according to the third embodiment has a mechanism for automatically turning off applied voltage to the halogen lamp 23 in the lighting controller 50, according to the photodetection signal 41 which comes from the silicon photo-diode 40 that detects infra-red light contained in light radiated by the excimer lamp 1 when the excimer lamp 1 lit, the halogen lamp 23 needs to be lit in the starting-up phase of the excimer lamp 1.

Fourth Embodiment

Figure 8:
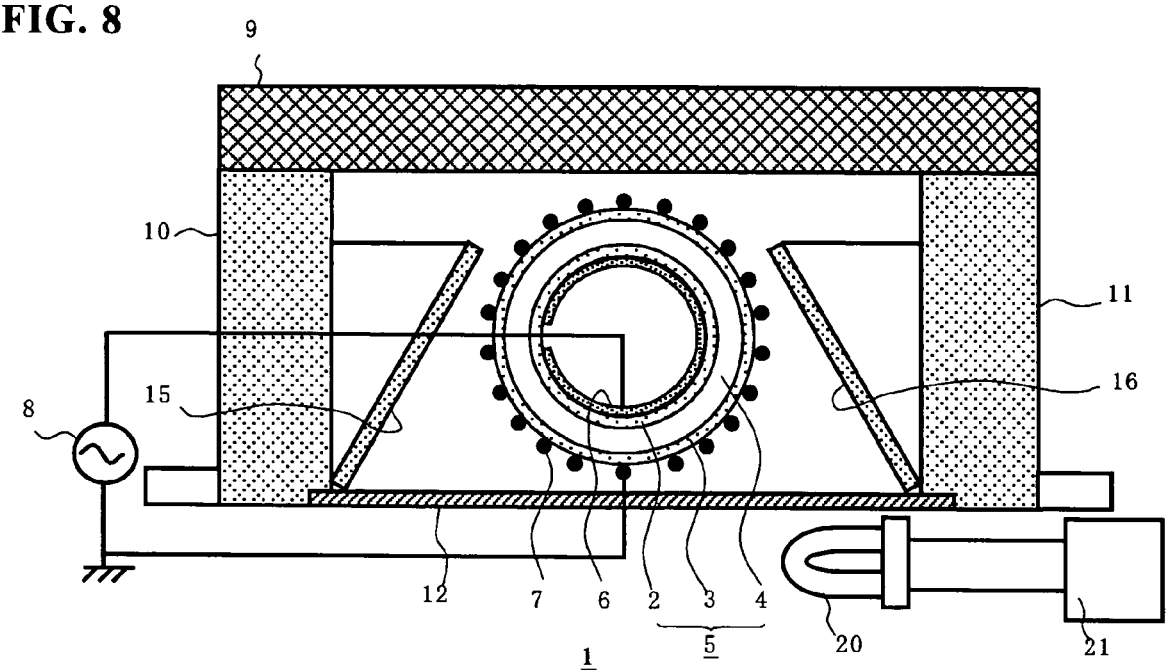
FIG. 8 is a cross sectional view of an excimer lamp apparatus according to a fourth embodiment of the present invention.

FIG. 8 shows a cross section of an excimer lamp apparatus according to a fourth embodiment of the present invention. Compared to the first embodiment shown in FIG. 1, the excimer lamp apparatus according to the fourth embodiment differs in the following points: the low-pressure mercury vapor lamp 20 is located outside the excimer light transmitting window 12 of the lamp housing and towards one side thereof; and consequently, an ultra-violet transmitting window 18 and an ultra-violet transmitting hole 17, provided in the upper cover 9 in the first embodiment, are unnecessary. The ultra-violet light from the low-pressure mercury vapor lamp 20 irradiates the xenon gas filled in the discharge space 4 of the excimer lamp 1 through the excimer light transmitting window 12 in the lamp housing.

As a result, the start-up time and the start-up probability of the excimer lamp 1 according to the fourth embodiment, measured while illuminating the low-pressure mercury vapor lamp 20, show the same advantage as in the first embodiment.

Another advantage with this embodiment is that it is easy to attach retrofit a low-pressure mercury vapor lamp to an excimer lamp apparatus that has already been installed in a production line.

Fifth Embodiment

Figure 9:
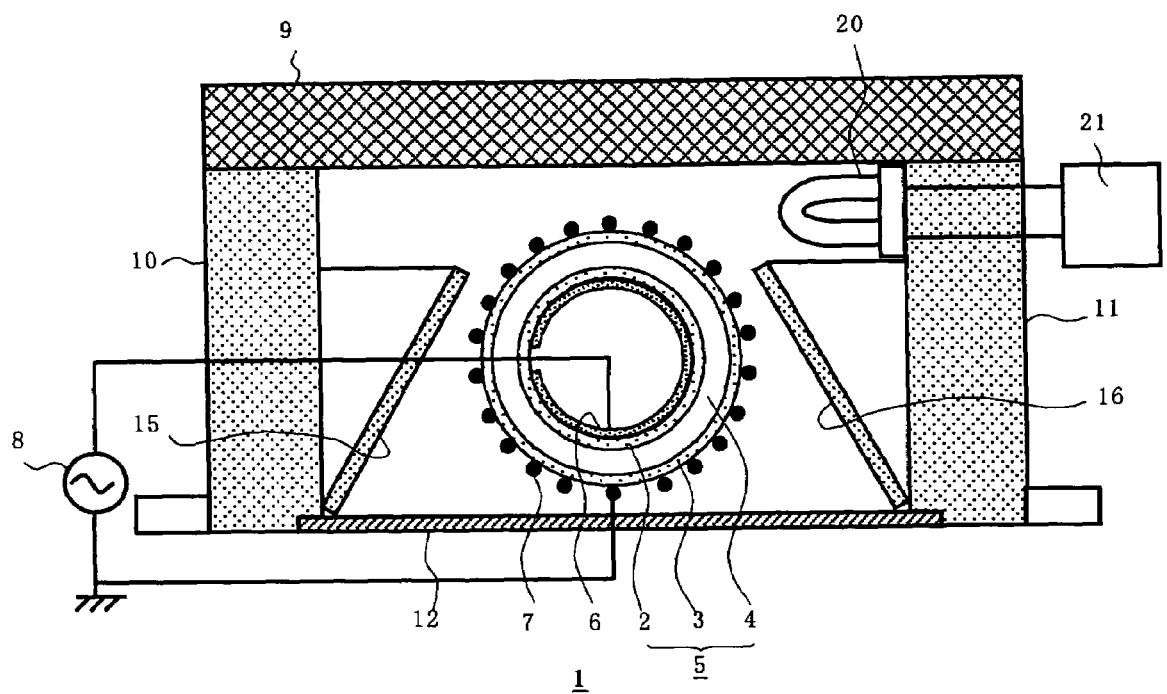
FIG. 9 is a cross sectional view of an excimer lamp apparatus according to a fifth embodiment of the present invention.

FIG. 9 shows a cross section of an excimer lamp apparatus according to a fifth embodiment of the present invention. Compared to the first embodiment shown in FIG. 1, the excimer lamp apparatus according to the fifth embodiment differs in the following points:

1) A low-pressure mercury vapor lamp 20 is placed inside the housing; and 2) consequently there is no ultra-violet transmitting hole 17 and ultra-violet transmitting window 18, which are provided in the upper cover 9 of the first embodiment. The low-pressure mercury lamp 20 emits ultra-violet light inside the lamp housing, and irradiates the xenon gas in the discharge space 4 in the excimer lamp 1.

Experiments showed that this excimer lamp 1 has the same advantages, regarding start-up probability and start-up time when lighting the low-pressure mercury vapor lamp 20, as the excimer lamp 1 in the first embodiment.

Sixth Embodiment

Figure 10:
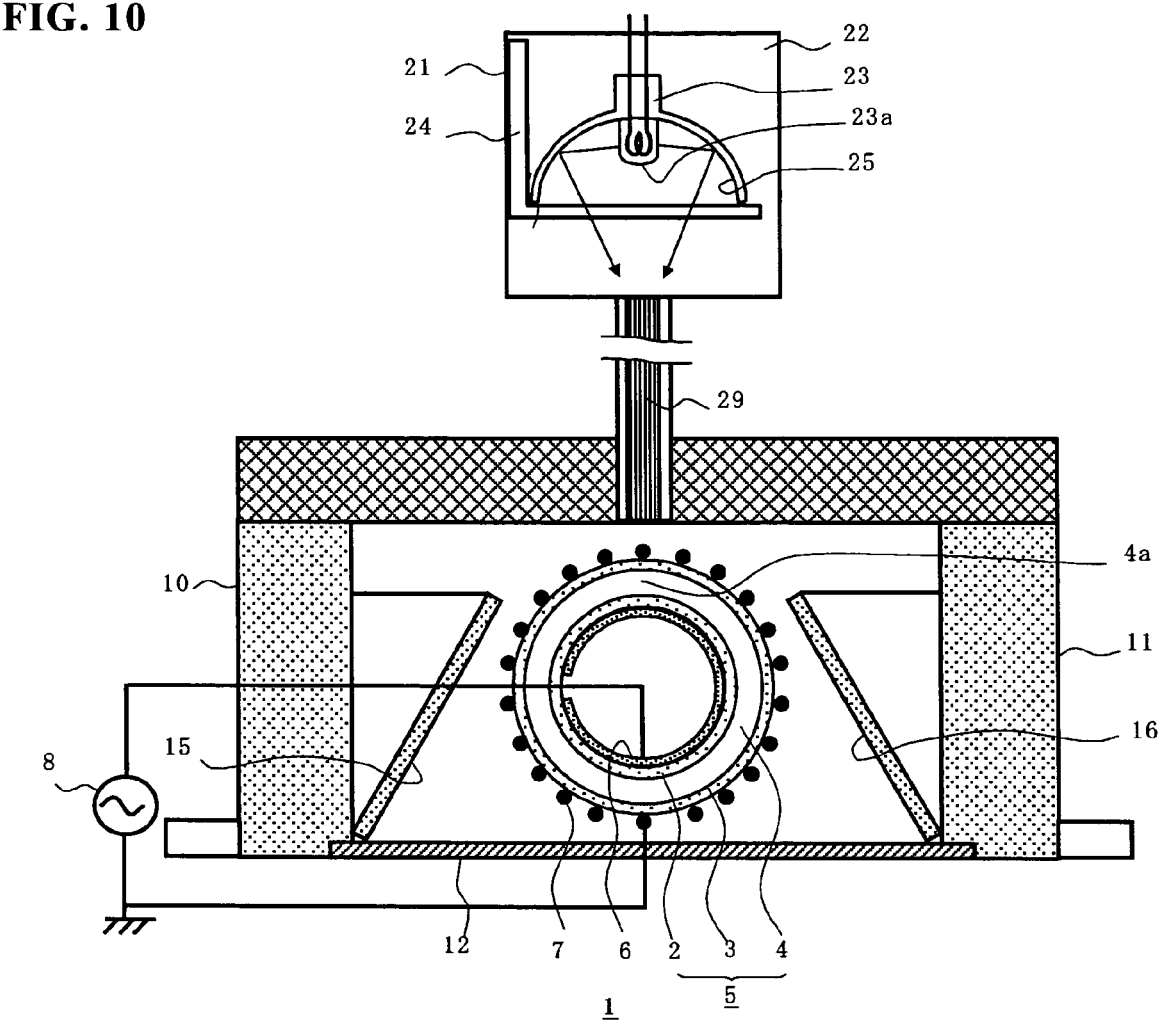
FIG. 10 is a cross sectional view of an excimer lamp apparatus according to a sixth embodiment of the present invention.

FIG. 10 shows a cross section of an excimer lamp apparatus according to a sixth embodiment of the present invention. Compared to the second embodiment shown in FIG. 4, the main difference in the excimer lamp apparatus according to the sixth embodiment is that ultra-violet light emitted from a halogen lamp 23 is focused and introduced into an optical fiber bundle 29, containing a plurality of bundled optical fibers, at the incident side of the fiber. Then, the ultra-violet light transmitted in the fiber illuminates the interior of the lamp housing through the exit side of the fiber bundle. The ultra-violet light emitted from the halogen lamp 23 also radiates the xenon gas filled in the discharge space 4 of the excimer lamp 1.

Figure 11:
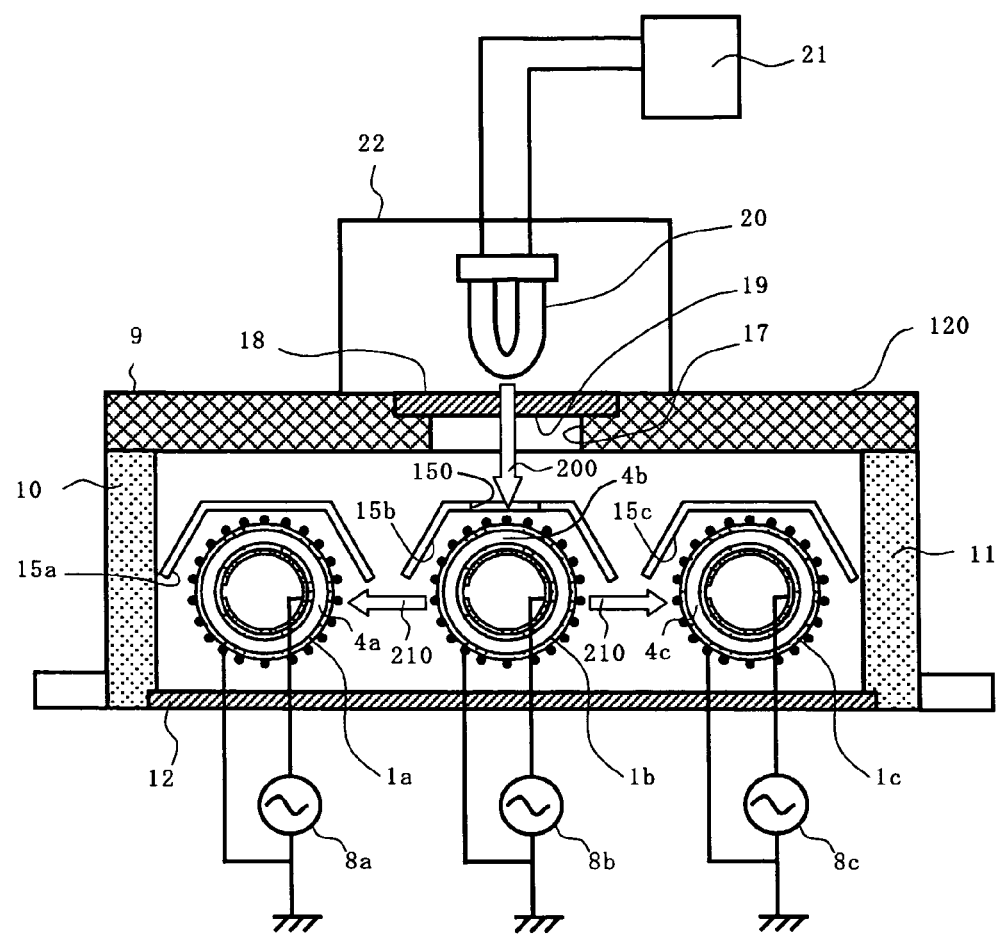
FIG. 11 is a cross sectional view of an excimer lamp apparatus according to a seventh embodiment of the present invention.

Experiments showed that this excimer lamp apparatus according to the sixth embodiment has the same advantages, regarding start-up probability and start-up time of the excimer lamp 1 when lighting the halogen lamp 23, as observed in the second embodiment Seventh Embodiment FIG. 11 shows a cross section of an excimer lamp apparatus according to a seventh embodiment of the present invention. Compared to the first embodiment of the present invention shown in FIG. 1, the main difference is that the excimer lamp apparatus according to the seventh embodiment has plural excimer lamps 1a, 1b and 1c, and plural reflection mirrors 15a, 15b, and 15c in the lamp housing.

In the seventh embodiment, ultra-violet light 200 from a low-pressure mercury vapor lamp 20 radiates only xenon gas that is encapsulated within a discharge space 4b of an excimer lamp 1b through an ultra-violet transmitting hole 17, which is located in an upper cover 9, and an ultra-violet transmitting hole 150, which is located in the reflection mirror 15b.

By applying a voltage to the excimer lamp 1b from a high-frequency power supply 8b while the discharge gas of the excimer lamp 1b is irradiated with the ultra-violet light 200 from the low-pressure mercury vapor lamp 20, the excimer lamp 1b starts to radiate with the same probability as the excimer lamp 1 according to the first embodiment.

As described above, in this seventh embodiment, only the excimer lamp 1b, but not the excimer lamps 1a and 1c, is radiated with the ultra-violet light 200 from the low-pressure mercury vapor lamp 20. Light containing ultra-violet light 210 from the excimer lamp 1b is radiated, and the light 210 including this ultra-violet light directly or indirectly irradiates xenon gas contained in the discharge spaces 4a and 4c of the other excimer lamps 1a and 1c provided in the lamp housing.

In this state, when high-frequency power supplies 8a and 8c apply voltages to the excimer lamps 1a and 1c, the start-up time of the excimer lamps 1a and 1c is improved and the excimer lamps 1a and 1c start up stably even if the supply voltage level fluctuates, and the excimer lamp 1b start-up properties are improved when the low pressure mercury vapor lamp 20 radiates ultra-violet light 200 to the excimer lamp 1b.

Eight Embodiment

The difference between the eighth embodiment and the seventh embodiment is the combination of lamps and lamp housings. In the seventh embodiment, plural lamps 1a, 1b and 1c are provided in one lamp housing. In the eighth embodiment, each lamp is housed in its own lamp housing, as shown in FIG. 12.

Figure 12:
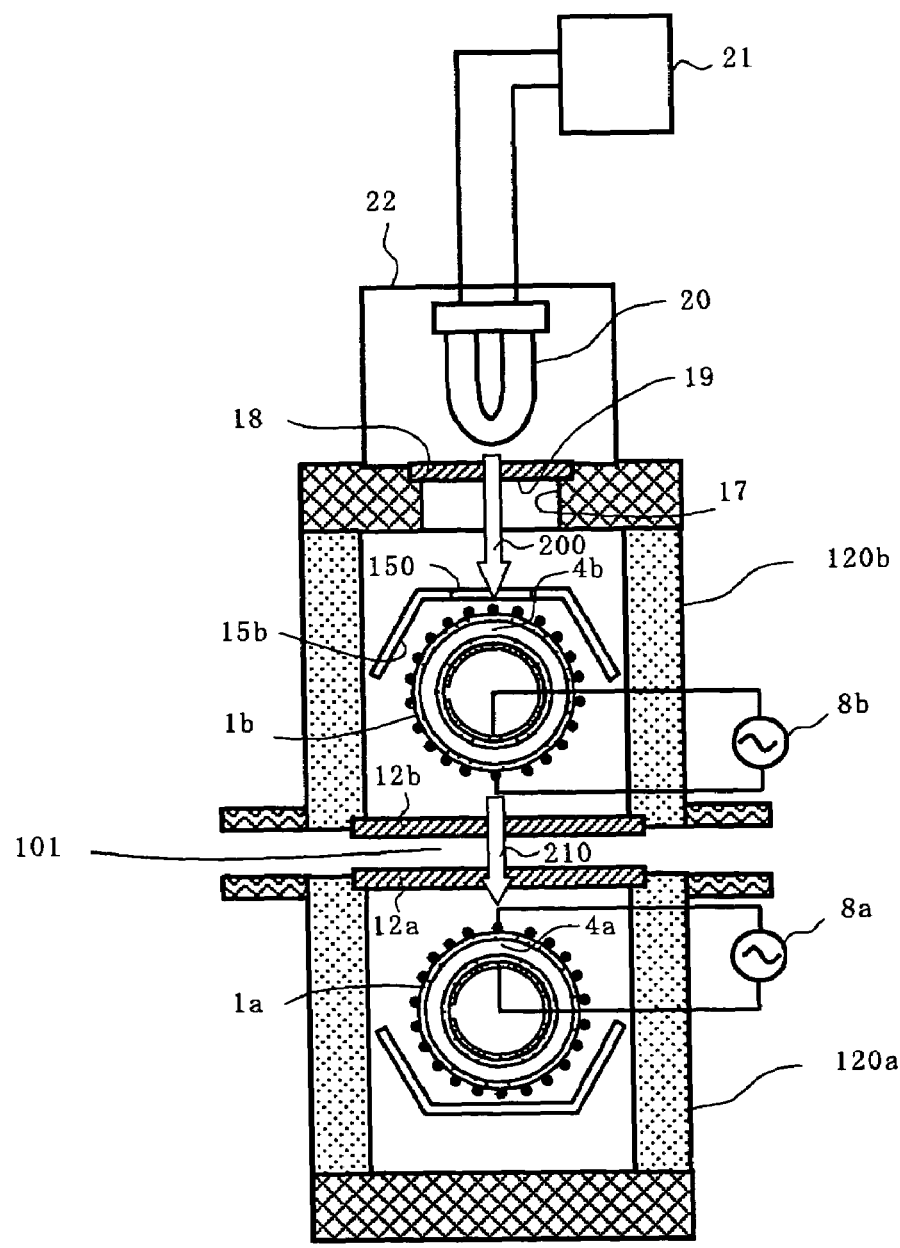
FIG. 12 is a cross sectional view of an excimer lamp apparatus according to a eighth embodiment of the present invention.

FIG. 12 shows an excimer lamp apparatus having two lamp housings 120a and 120b facing corresponding excimer light transmitting windows 12a and 12b. When an object to be processed, which is not actually illustrated, is inserted in a processing chamber 101 positioned between the excimer light transmitting windows 12a and 12b, both sides of the object will be processed at the same time.

The lighting mechanism of the excimer lamp 1b according to the eighth embodiment of the present invention is the same as the lamp according to the seventh embodiment. The excimer lamp 1b radiates light 210 by applying a voltage to the excimer lamp 1b from the high-frequency power supply 8b while the low-pressure mercury vapor lamp 20 radiates ultra-violet light 200 to the discharge space 4b of the excimer lamp 1b.

The excimer lamp 1b radiates light 210 containing ultra-violet light to the discharge space 4a through the excimer light transmitting window 12b in a lamp housing 120b, through the processing chamber 101, and then through the excimer light transmitting window 12a in the lamp housing 120a, which faces the excimer light transmitting window 12b.

In this state, by applying a voltage to the excimer lamp 1a from the high-frequency power supply 8a, similar to the case where the excimer lamp 1b is irradiated with light 200 from the low-pressure mercury vapor lamp 20, the excimer lamp 1a starts up quickly, and the excimer lamp 1a reliably starts up even when the voltage applied to the electrode fluctuates.

Ninth Embodiment

Figure 13:
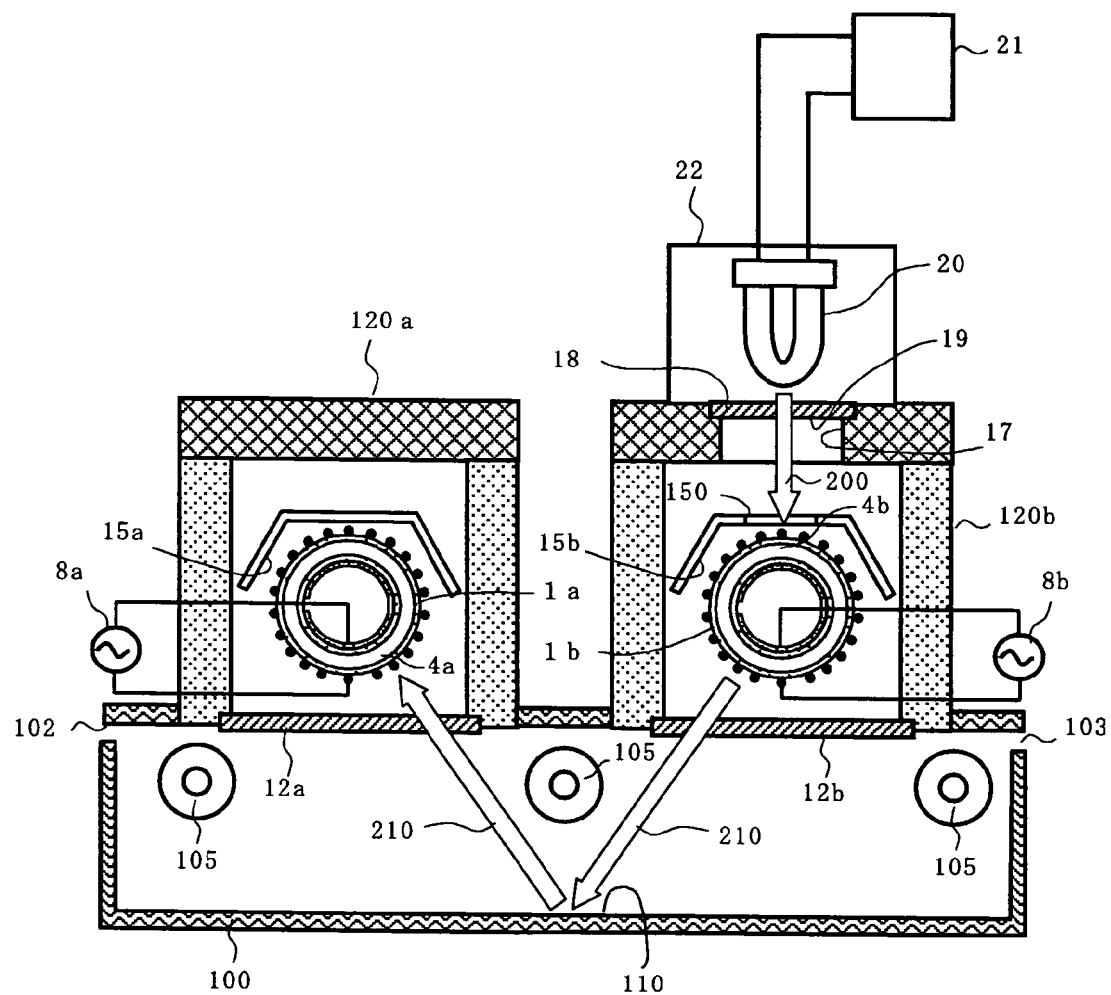
FIG. 13 is a cross sectional view of an excimer lamp apparatus according to a ninth embodiment of the present invention.

In the excimer lamp apparatus according to the eighth embodiment an example has been given in which light transmitting windows are disposed so as to face the plurality of excimer lamps 1a and 1b. However, in this excimer lamp apparatus according to a ninth embodiment, which has plural excimer lamps, there are other types of arrangement of the excimer light transmitting windows. FIG. 13 shows the excimer lamp apparatus according to the ninth embodiment in which all excimer light transmitting windows of every excimer lamps are aligned along with a same plane so as to face the same direction.

The excimer lamp apparatus shown in FIG. 13 is an excimer lamp to process a sheet shaped object, which is not actually illustrated, that is inserted from an opening 102 formed in a processing chamber 100, and to be carried by carrier rollers 105 past excimer light transmitting windows 12a and 12b in order to process one side surface of the sheet shaped object for surface cleaning or surface treatment. Both excimer light transmitting windows 12a and 12b of lamp housings 120a and 120b are arranged in the same plane so as to face the same direction.

In the lamp apparatus according to the ninth embodiment, a low-pressure mercury vapor lamp 20 radiates ultra-violet light 200 to the excimer lamp 1b, then excimer lamp 1b radiates light 210 containing ultra-violet light. By exposing the excimer lamp 1a indirectly to the light 210, which is reflected by an inner wall 110 in the processing chamber 100 and reaches the excimer lamp 1a located in the other lamp housing, the excimer lamp 1a also starts-up quickly and stably even when the applied voltage fluctuates.

According to the eighth and ninth embodiments, it is possible to obtain the same starting-up benefits that are obtained in the first embodiment, without the need to provide one low-pressure mercury lamp for every lamp housing.

These embodiments of excimer lamp apparatuses described above have discharge spaces whose shape is a bi-cylindrical double tube and have a pair of electrodes, to which high-frequency power supply is applied, on respective outside surfaces of a discharge container on the far side of the discharge space in the container. The shapes of the discharge container according to the present invention may be cylinder like or substantially planar shaped like a box, and the electrodes may be inside the discharge container.

Figure 14:
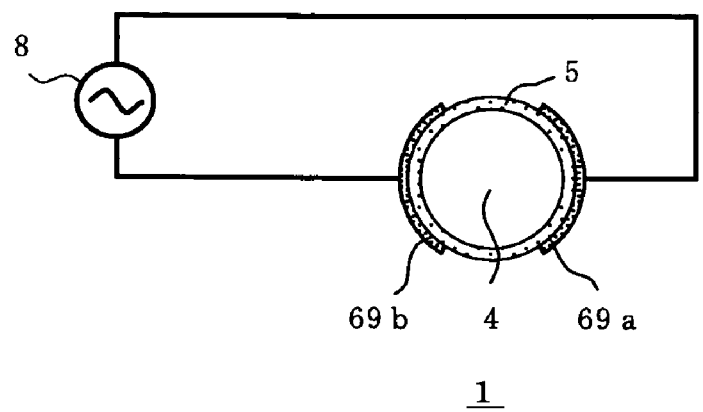
FIG. 14 is a cross sectional view of an excimer lamp having a cylinder shape according to the present invention.

FIG. 14 shows a vertical cross section of a discharge container whose shape is single cylinder as one type of discharge container whose shape is not a bi-cylindrical tube.

A discharge container 5 according to the FIG. 14 is made of quartz glass and filled with xenon gas as a discharge gas. Pair of electrodes 69a and 69b are arranged on the outside surface of the discharge container 5. Electrodes 69a and 69b are aluminum strips, which are closely attached to the discharge container, and high-frequency voltages are applied to these electrodes from a high-frequency power supply 8. The shapes of these electrodes 69a and 69b may be a thin film or mesh shape, besides the strip like shape. Regarding the material of these electrodes, they may be made of metal having high corrosion resistance, such as stainless steel, monel (registered trademark), or gold.

Figure 15:
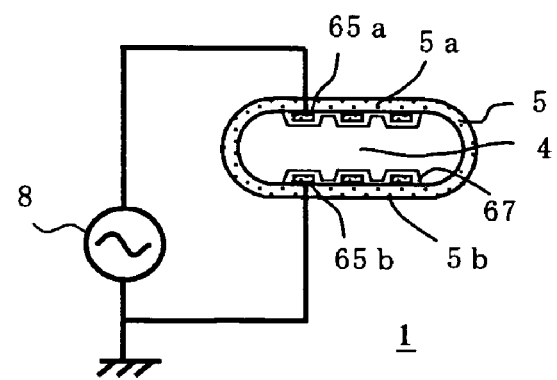
FIG. 15 is a cross sectional view of an excimer lamp having a substantially planar shape according to the present invention.

FIG. 15 shows a cross section of an excimer lamp 1 of an excimer lamp apparatus which has a substantially planar shape, a discharge container 5, which is made of quartz glass, has two planar walls 5a and 5b facing each other, and electrodes 65a and 65b arranged on the inside surfaces of the walls 5a and 5b. These electrodes 65a and 65b are covered with a dielectric film 67, which is made of silicon oxide, and the discharge container 5 is filled with xenon gas as a discharge gas.

Tenth Embodiment

Figure 16:
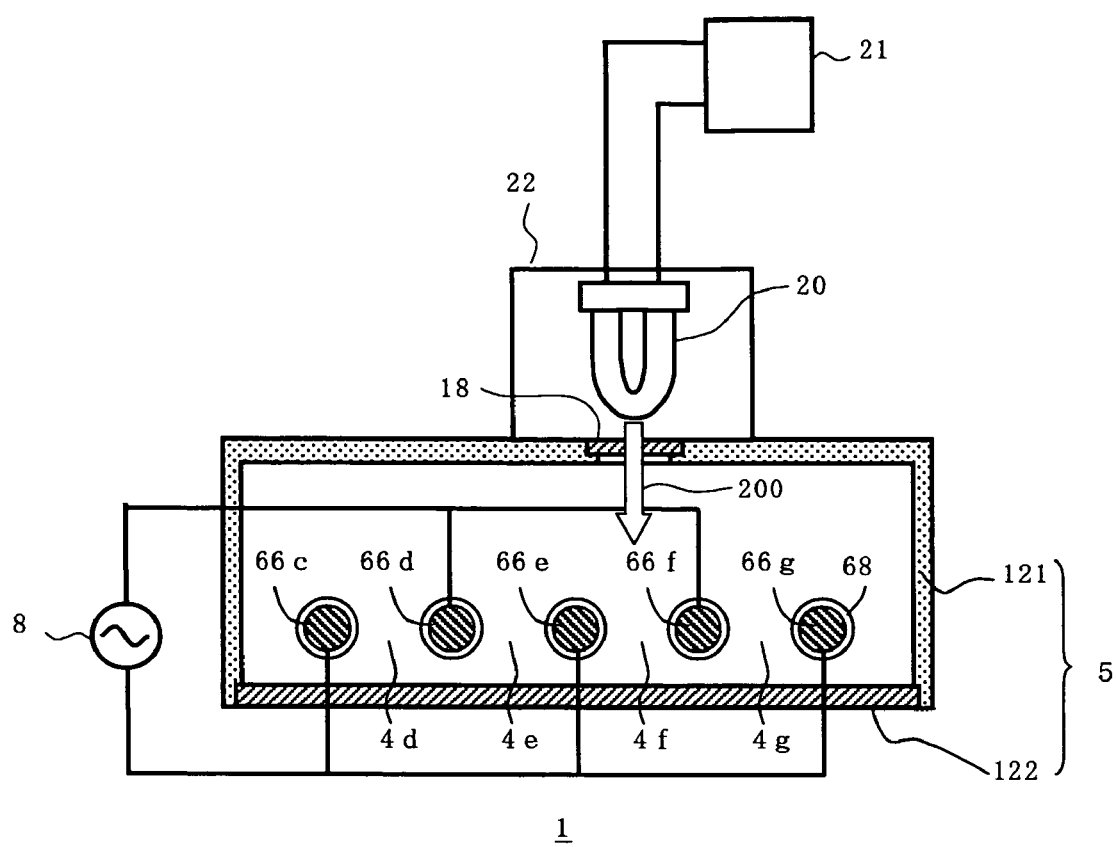
FIG. 16 is a cross sectional view of an excimer lamp apparatus according to a tenth embodiment of the present invention.

FIG. 16 shows vertical cross section of an excimer lamp apparatus with a box-shaped discharge container according to a tenth embodiment of the present invention. An excimer lamp 1 used in the tenth embodiment has a box-shaped discharge container 5 that is comprised of an excimer light transmitting window 122 made of quartz glass and a ceramic case 121. The excimer lamp 1 also has a plurality of electrodes 66c, 66d, 66e, 66f and 66g that are arranged inside the discharge container 5. Xenon gas is filled as a discharge gas inside the discharge container 5.

The plurality of electrodes are made of metal strips coated with a dielectric film 68 of silicon oxide and are grouped into two polarity groups: one group includes 66c, 66e and 66g and another includes 66d and 66f; and they are arranged one-polarity after another-polarity alternately; and consequently they formed discharge spaces 4d, 4e, 4f and 4g.

In the tenth embodiment, an ultra-violet emitter 20 radiates ultra-violet light 200 to the discharge spaces 4d, 4e, 4f and 4g through an ultra-violet transmitting window 18 that is formed in the case 121 which constitutes the discharge container 5. In this state, a high-frequency power supply 8 applies a voltage to each group of electrodes in the excimer lamp 1, and then the excimer lamp 1 starts to emit.

The tenth embodiment of present invention is different from the first to ninth embodiments, regarding the location of electrodes that are arranged inside discharge container, but the same advanced starting-up properties as these embodiments, such as stable starting-up ability in the presence of fluctuations of the applied voltage, particularly when the applied voltage is low, are obtained and a sufficient discharge space are also obtained because there are no trigger electrodes.

Regarding the material of the cover 121, it may be inorganic material like multicomponent glass or a metal like aluminum or stainless steel.

Concerning the discharge gas, we use xenon gas, which emits 172 nm vacuum ultra-violet light, as a discharge gas in the embodiments above; however, in the present invention, other gases that are mentioned above in the brief summary of the invention may be used as a discharge gas, depending on the desired wavelength.

As for the ultra-violet emitter, a low-pressure mercury vapor lamp and halogen lamp are used in the embodiments above, but other light sources, such as a semiconductor ultra-violet light-emitting diode which mainly radiates ultra-violet light and an ultra-violet lamp like a black-light, are also acceptable as the ultra-violet emitter.

INDUSTRIAL APPLICABILITY

The present invention allows an excimer lamp apparatus with improved start-up properties without a trigger electrode to be provided and also allows an excimer lamp apparatus that has stable start-up properties under various conditions to be provided, for example, if the supply voltage level to an electrode fluctuates, especially in the case where the supply voltage is reduced.

The invention claimed is:

1. An excimer lamp apparatus comprising:
   a discharge container that has a discharge space filled with discharge gas to generate excimer light, a part of said discharge container being transparent to said excimer light to be emitted from said discharge space;
   an excimer lamp that has electrodes and that generates a discharge in said discharge gas within said discharge space;
   a power supply for applying a voltage to said electrodes; and
   an ultra-violet emitter that is arranged in said excimer lamp apparatus to radiate ultra-violet light to said discharge gas filled in said discharge space,
   wherein said excimer lamp starts up by applying a voltage to said electrodes when said ultra-violet emitter is radiating ultra-violet light to said discharge gas.

2. The excimer lamp apparatus as claimed in claim 1, wherein said excimer lamp has a pair of facing electrodes on respective outside surfaces of said discharge container.

3. The excimer lamp apparatus as claimed in claim 1 or claim 2, further comprising:
   a lamp housing in which said excimer lamp is housed; and
   an ultra-violet transmitting window that is located in a part of a wall of said lamp housing, wherein said ultra-violet emitter is located outside said lamp housing and ultra-violet light that said ultra-violet emitter emits passes through said ultra-violet transmitting window, and irradiates said discharge gas.

4. The excimer lamp apparatus as claimed in claim 3 wherein a thin film layer is formed on the surface of said ultra-violet transmitting window, which blocks vacuum ultra-violet light with a wavelength under 200 nm and transmits ultra-violet light whose wavelength is larger than 200 nm.

5. The excimer lamp apparatus as claimed in claim 3 further comprising:
light detecting means for detecting light whose wavelength is contained in the excimer light that said excimer lamp emits; and
voltage shut-off means for automatically shutting off the voltage applied to said ultra-violet emitter in accordance with detected results of said light detecting means.

6. The excimer lamp apparatus claimed in claim 3, wherein at least one ultra-violet emitter is provided, and at least one excimer lamp is provided, and the number of ultra-violet emitters is less than the number of excimer lamps.

7. The excimer lamp apparatus as claimed in claim 1 or claim 2, further comprising an ultra-violet transmitting window that is located in a part of a wall of said excimer lamp, wherein ultra-violet light that said ultra-violet emitter emits passes through said ultra-violet transmitting window, and irradiates said discharge gas.

8. The excimer lamp apparatus as claimed in claim 7 wherein a thin film layer is formed on the surface of said ultra-violet transmitting window, which blocks vacuum ultra-violet light with a wavelength under 200 nm and transmits ultra-violet light whose wavelength is larger than 200 nm.

9. The excimer lamp apparatus as claimed in claim 7 further comprising:
light detecting means for detecting light whose wavelength is contained in the excimer light that said excimer lamp emits; and
voltage shut-off means for automatically shutting off the voltage applied to said ultra-violet emitter in accordance with detected results of said light detecting means.

10. The excimer lamp apparatus as claimed claim 1 or 2 further comprising:
light detecting means for detecting light whose wavelength is contained in the excimer light that said excimer lamp emits; and
voltage shut-off means for automatically shutting off the voltage applied to said ultra-violet emitter in accordance with detected results of said light detecting means.

11. The excimer lamp apparatus claimed in claim 1 or 2, wherein at least one ultra-violet emitter is provided, and at least one excimer lamp is provided, and the number of ultra-violet emitters is less than the number of excimer lamps.

* * * * *